(12) United States Patent
Shyong et al.

(10) Patent No.: US 10,636,416 B2
(45) Date of Patent: Apr. 28, 2020

(54) SMART NETWORK DEVICE AND METHOD THEREOF

(71) Applicant: WISTRON NEWEB CORPORATION, Hsinchu (TW)

(72) Inventors: Yee-Lee Shyong, Hsinchu (TW);
Chen-Chao Chang, Hsinchu (TW);
Ying-Hui Liang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 12 days.

(21) Appl. No.: 16/191,588

(22) Filed: Nov. 15, 2018

(65) Prior Publication Data

US 2019/0244602 A1 Aug. 8, 2019

Related U.S. Application Data

(60) Provisional application No. 62/626,688, filed on Feb. 6, 2018.

(51) Int. Cl.
*G10L 15/08* (2006.01)
*G10L 15/02* (2006.01)
*G10L 15/30* (2013.01)
*G06F 16/901* (2019.01)
*G10L 15/32* (2013.01)
*G10L 15/28* (2013.01)

(52) U.S. Cl.
CPC .......... *G10L 15/08* (2013.01); *G06F 16/9017* (2019.01); *G10L 15/02* (2013.01); *G10L 15/28* (2013.01); *G10L 15/30* (2013.01); *G10L 15/32* (2013.01); *G10L 2015/088* (2013.01)

(58) Field of Classification Search
CPC .......... G10L 15/30; G10L 15/32; G10L 15/28
See application file for complete search history.

(56) References Cited

U.S. PATENT DOCUMENTS

| | | | | |
|---|---|---|---|---|
| 4,945,570 A * | 7/1990 | Gerson | ................... | G10L 15/22 379/388.04 |
| 9,159,319 B1 * | 10/2015 | Hoffmeister | ............ | G10L 15/08 |
| 2004/0199388 A1 * | 10/2004 | Armbruster | ............. | G10L 15/22 704/251 |
| 2016/0125883 A1 * | 5/2016 | Koya | ...................... | G10L 15/30 704/232 |
| 2017/0004828 A1 * | 1/2017 | Lee | .......................... | G10L 15/00 |

(Continued)

*Primary Examiner* — Samuel G Neway
(74) *Attorney, Agent, or Firm* — McClure, Qualey & Rodack, LLP

(57) ABSTRACT

A network device is connected to user device and includes a processor and a memory storing executable code executed by the processor. The network device is configured to receive first keyword data and speech data followed by the first keyword data; determine whether the first keyword data corresponds to a first keyword; in response to determining that the first keyword data corresponds to the first keyword, recognize word information from the speech data to generate at least one word recognition result; send the at least one word recognition result through a first communication path to a first network; and in response to determining that the first keyword data corresponds to a second keyword, stop recognizing the word information from the speech data followed by the first keyword data, and send the speech data through a second communication path to the first user device.

17 Claims, 6 Drawing Sheets

(56) References Cited

U.S. PATENT DOCUMENTS

| | | | |
|---|---|---|---|
| 2017/0365257 A1* | 12/2017 | Lin | G10L 15/08 |
| 2019/0147850 A1* | 5/2019 | Almudafar-Depeyrot | G10L 13/043 |
| 2019/0244602 A1* | 8/2019 | Shyong | G10L 15/30 |
| 2019/0295555 A1* | 9/2019 | Wilberding | G10L 17/02 |

* cited by examiner

SMART NETWORK DEVICE AND METHOD THEREOF

CROSS-REFERENCE TO RELATED PATENT APPLICATION

This application claims the priority to and the benefit of, pursuant to 35 U.S.C. § 119(e), U.S. provisional patent application Ser. No. 62/626,688, filed Feb. 6, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD OF THE PRESENT DISCLOSURE

The present disclosure relates to a smart network device and method thereof, and more particularly to a smart network device capable of selecting between communication paths based on speech recognition results and user device availability.

BACKGROUND OF THE PRESENT DISCLOSURE

A traditional Wi-Fi access point (AP) provides wireless communication for a user device so that the user device can connect to the AP, and a traditional personal assistant device is capable of speech recognition and information access on Internet. However, such a personal assistant device supports only one type of voice interaction application (VIA) or operating system (OS) installed in the user device, and therefore has limited compatibility with user devices. Accordingly, there is still room for improvement for an AP's user device compatibility.

SUMMARY OF THE PRESENT DISCLOSURE

In response to the above-referenced technical inadequacies, the present disclosure provides a smart network device.

In one aspect, the present disclosure directs to a network device is connected to user device and includes a processor and a memory storing executable code executed by the processor. The network device is configured to receive first keyword data and speech data which is followed by the first keyword data; determine whether the first keyword data corresponds to a first keyword; in response to determining that the first keyword data corresponds to the first keyword, recognize word information from the speech data to generate at least one word recognition result; send the at least one word recognition result through a first communication path to a first network; and in response to determining that the first keyword data corresponds to a second keyword, stop recognizing the word information from the speech data followed by the first keyword data, and send the speech data through a second communication path to the at least one user device.

In another aspect, the present disclosure directs to a method for determining a communication path for a network device, the network device connected to at least one user device, comprising: receiving first keyword data and speech data which is followed by the first keyword data; determine whether the first keyword data corresponds to a first keyword by a processor; in response to determining that the first keyword data corresponds to the first keyword, recognize word information from the speech data to generate at least one word recognition result; sending the at least one word recognition result through a first communication path to a first network; and in response to determining that the first keyword data corresponds to a second keyword, stopping recognizing the word information from the speech data, and sending the first keyword data and the speech data through a second communication path to the at least one user device.

These and other aspects of the present disclosure will become apparent from the following description of certain embodiments taken in conjunction with the following drawings and their captions, although variations and modifications therein may be affected without departing from the spirit and scope of the novel concepts of the present disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
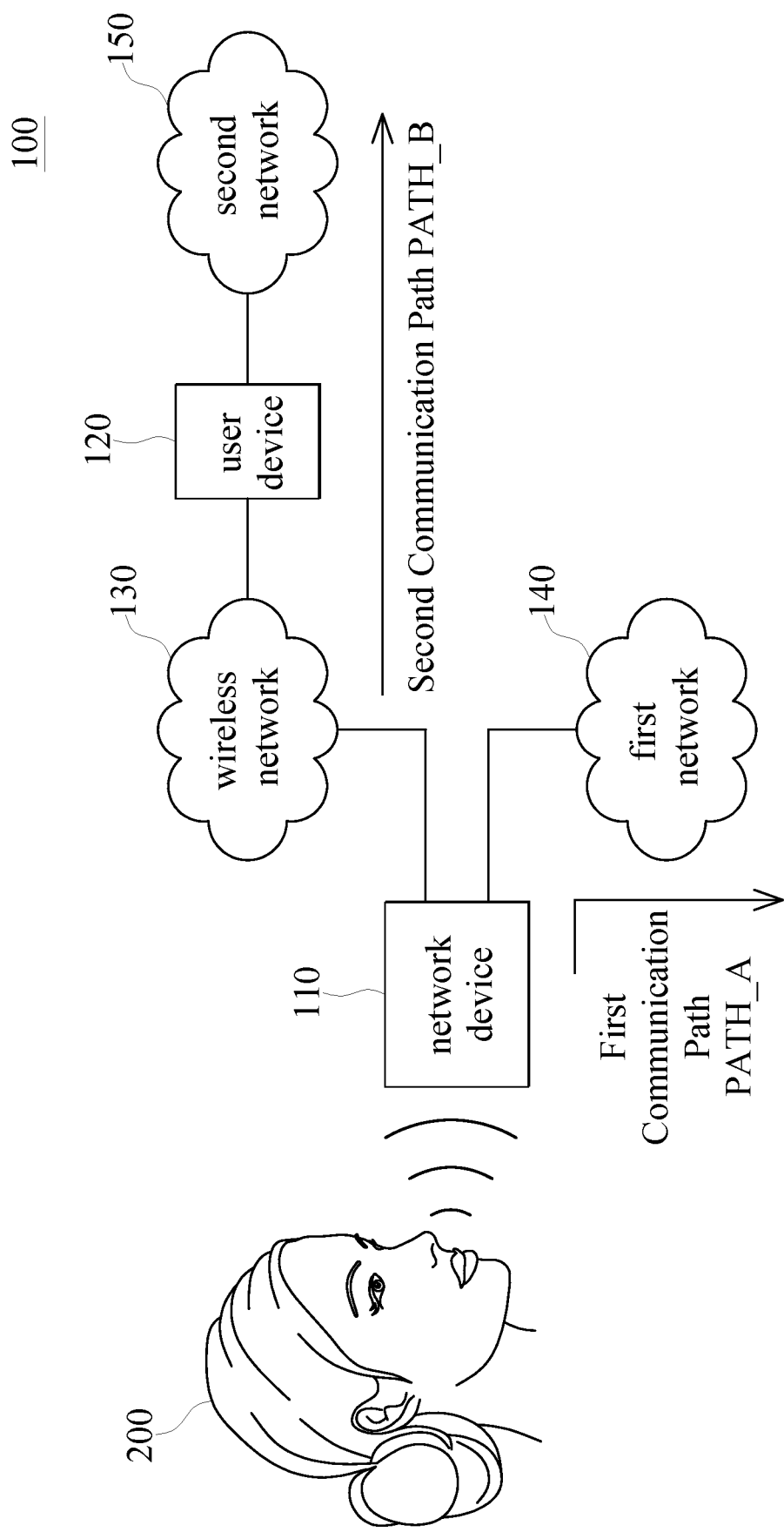
FIG. 1 is a schematic diagram of a networking system 100 according to certain embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

FIG. 1 schematically depicts a networking system 100 according to certain embodiments of the present disclosure. As shown in FIG. 1, the networking system 100 includes a network device 110, a user device 120, a wireless network 130, a first network 140 and a second network 150. The network device 110 and the user device 120 are communicatively interconnected via the wireless network 130. The user device 120 is further communicatively interconnected to the second network 150 to access and retrieve data from the second network 150. Based on utterances of the user 200, the network device 110 may select to access and retrieve data from the first network 140 through a first communication path PATH_A, that is, between the network device 110 and the first network 140, or the network device 110 may select to access and retrieve data from the second network 150 through a second communication path PATH_B, that is, through the wireless network 130, the user device 120, and the second network 150.

The wireless network 130 is a network employing wireless data connections between network nodes. In certain embodiments, the wireless network 130 may be a wireless personal area network (WPAN) such as a Bluetooth network under the Bluetooth protocol, which enables pairing and communications between the network device 110 and the user device 120 through Bluetooth connections. In certain embodiments, the wireless network 130 may be a wireless local area network (WLAN) such as a Wi-Fi network under the 802.11 standards, which enables communications between the network device 110 and the user device 120 through Wi-Fi connections. In certain embodiments, the wireless network may be any other wireless networks under different wireless protocols enabling wireless communications between the network device 110 and the user device 120.

The first network 140 and the second network 150 may each be a wired or wireless network, a private or public network, or a private database, which includes, but is not limited to, a local area network (LAN), or a wide area network (WAN) including the Internet, and may be of various forms. The first network 140 is communicatively interconnected with the network device 110, and the second network 150 is communicatively interconnected with the user device 120. The communicative connection between the first network 140 and the network device 110 and between the second network 150 and the user device 120 may be wired or wireless via, for example, a gateway, an Ethernet, wireless wide area network (WWAN) standards such as 3G, 4G Long-Term Evolution (LTE), LTE Advanced or 5G or WLAN standards such as Wi-Fi under the 802.11 protocols. In certain embodiments, the first network 140 may be independent and separate from the second network 150. In certain embodiments, the first network 140 and the second network 150 are one and the same network, or both the network device 110 and the user device 120 are connected with the first network 140 or the second network 150.

The network device 110 is a data-mediating device capable of selecting between communication paths and networks based on the utterances of the user 200, and selectively sending speech data not yet recognized to any of a plurality of user devices 120 connected with the network device 110 for speech recognition, or sending word recognition results of recognized speech data directly to a network connected with the network device 110 without being mediated by a user device 120. In certain embodiments, the network device 110 selects a communication path based on the operating system (OS) or voice interaction application (VIA) installation status or identities of the user devices 120, and thereby differentiating between the user devices 120 installed with different OSs or VIAs and between those have the same installation status. For example, the VIA could be Siri® for Apple iOS, Google Assistant® for Google Android, Amazon Alexa® for its corresponding OS and etc.. In certain embodiments, the network device 110 may be an AP. In other words, a single network device 110 is compatible with different user devices 120 having different or the same OS/VIA installation status, and therefore enables higher use flexibility for the user 200 by allowing the user 200 to access and retrieve data through different user devices 120 with different or the same OS/VIA and through different communication paths mediated or not mediated by a user device 120.

In certain embodiments, the network device 110 may select between a first communication path PATH_A without being mediated by the user device 120 for connecting to the first network 140, and a second communication path PATH_B through the wireless network 130 and the user device 120 for connecting to the second network 150, according to at least one keyword voiced by the user 200 to the network device 110 and the availability of a user device 120 connected to the network device 110 that is corresponding to the keyword. The network device 110 may recognize the keyword voiced by the user, determine whether any user device 120 corresponding to the keyword is connected with the network device 110, and in response to determining that such connection presents, transfer speech data without recognition through the second communication path PATH_B to the user device 120 for speech recognition and data search on the second network 150 based on the speech recognition, so as to obtain search results, and receive the search results through the second communication path PATH_B from the user device 120.

The user device 120 is a computing device used by a user (i.e., a person) for computation and network connection purposes. The user device 120 has capacities of commutatively interconnected with the network device 110 through the wireless network 130, and with the second network 150 wiredly or wirelessly. Examples for the user device 120 include, but are not limited to, mobile phones, laptops, and tablets.

Figure 2:
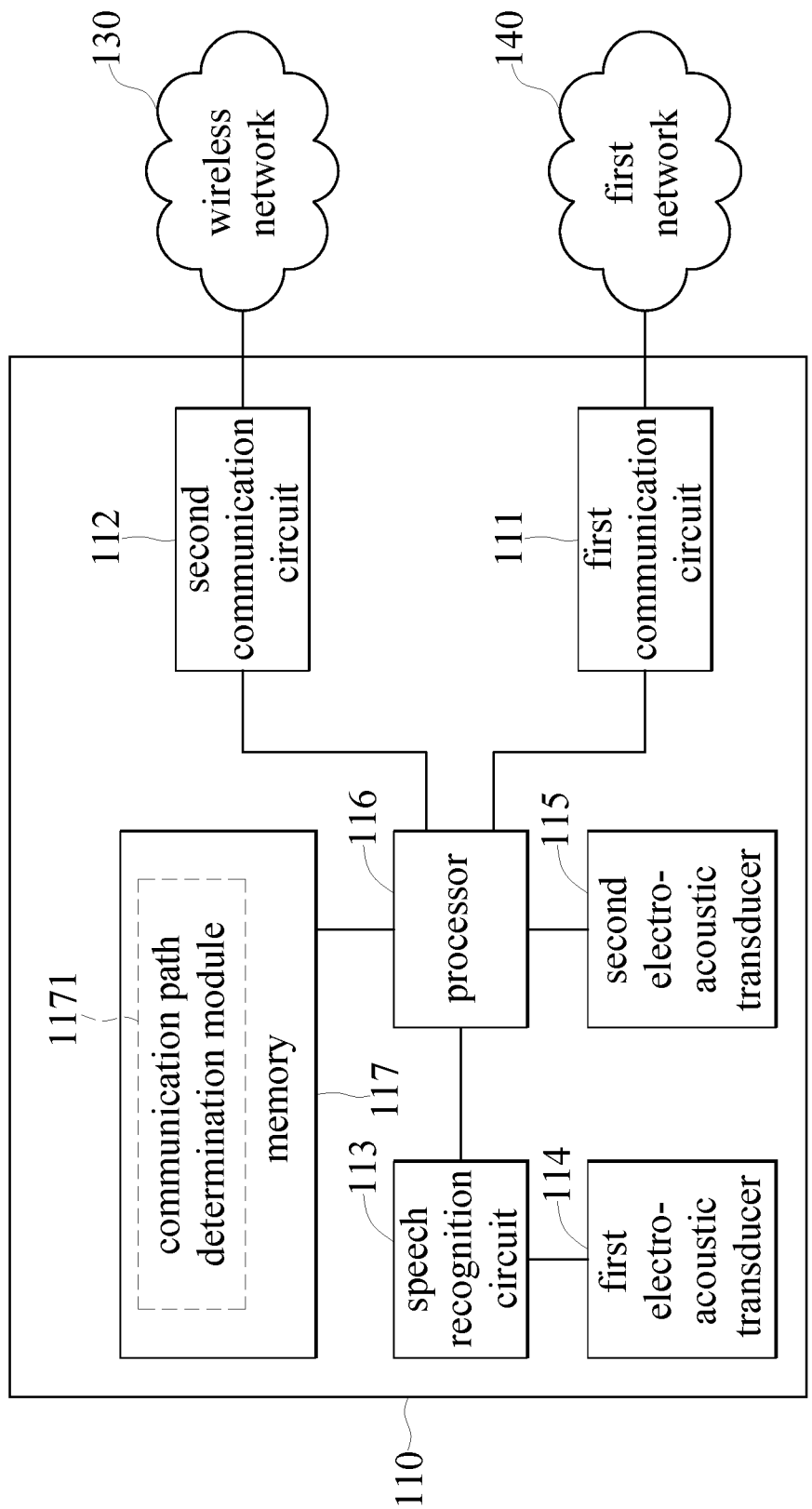
FIG. 2 is a schematic diagram of a network device 110 according to certain embodiments of the present disclosure.

FIG. 2 schematically depicts the network device 110 according to certain embodiments of the present disclosure. The network device 110 includes a first communication circuit 111, a second communication circuit 112, a voice recognition circuit 113, a first electro-acoustic transducer 114, a second electro-acoustic transducer 115, a processor 116, a memory117 including a communication path determination module 1171. In certain embodiments, the speech recognition circuit 113 is electrically connected with the first electro-acoustic transducer 114, the processor 116 and the memory 117, and the processor 116 is electrically connected with the first communication circuit 111, the second communication circuit 112, the speech recognition circuit 113, the second electro-acoustic transducer 115, the memory 117. However, the present disclosure is not limited thereto. In certain embodiments, the first electro-acoustic transducer 114 is also directly electrically connected with the processor 116.

The first communication circuit 111 has communication capabilities to enable wireless or wired communication between the network device 110 and the first network 140 via, for example, a gateway, an Ethernet, WWAN standards such as 3G, 4G LTE, LTE Advanced or 5G, or WLAN standards such as Wi-Fi under the 802.11 protocols, and therefore enables the first communication path PATH_A.

The second communication circuit 112 has wireless (e.g. Bluetooth or Wi-Fi) communication capabilities to enable wireless communication, pairing and/or device information exchange including device identifications (IDs) between the network device 110 and the user device 120 through the wireless network 130, and therefore enables the second communication path PATH B, so that the network device 110 can receive device information of the user device 120 including, but not limited to, the device ID, the model, the OS, the VIA(s), and the corresponding password(s) of the user device 120. In certain embodiments, the second communication circuit 112 has network communication capabilities different from that of the first communication circuit 111. In certain embodiments, the second communication circuit 112 has a lower operating power than the first communication circuit 111, for example, a lower operating voltage or lower wattage, and saves more power than the first communication circuit 111 does when operating. Accordingly, the network device 110 consumes less power by selecting the second communication path PATH_B through the second communication circuit 112 over the first communication path PATH_A through the first communication circuit 111.

The first electro-acoustic transducer 114 is a transducer configured to convert acoustic signals to electrical signals. The first electro-acoustic transducer 114 may receive acoustic signals produced by the utterances of the user 200, convert the acoustic signals to electrical speech data, including keyword data and speech data followed by the keyword data, corresponding to the utterances of the user 200, and send the keyword data to the speech recognition circuit 113. In certain embodiments, the first electro-acoustic transducer 114 may be a microphone.

The second electro-acoustic transducer 115 is a transducer configured to convert electrical signals to acoustic signals. The second electro-acoustic transducer 115 may receive electrical signals corresponding to the search results in reply to the recognized speech data/word recognition results from either the second communication circuit 112 and second network 150, that is, the second communication path PATH_B, or the first communication circuit 111 and the first network 140, that is, the first communication path PATH_A, and convert the electrical signals to acoustic signals, so that the user 200 can perceive such acoustic signals. In certain embodiments, the second electro-acoustic transducer 115 may be a speaker.

The speech recognition circuit 113 is a circuit configured to recognize word information from the electrical speech data converted from acoustic utterances of the user 200 by the first electro-acoustic transducer 114. The speech recognition circuit 113 may receive from the first electro-acoustic transducer 114 speech data corresponding to an utterance voiced by the user 200, and recognize the word information from the speech data to generate a word recognition result including at least a word or character recognized from the speech data. Then the speech recognition circuit 113 sends the word recognition result to the processor 116. The processor 116 executes VIA stored in the memory 117 and further searches in the database of the first network 140 according to the word recognition result through VIA. In certain embodiments, as shown below in a first look-up table (LUT) and a second LUT, in order for the processor 116 retrieving recognized keyword data, the first LUT or the second LUT is established by the processor 116 and stored in the memory 117.

The LUT establishment flow would be described. At the beginning, when the network device 110 is connected to a network and a first user device, the device information of the first user device will be transmitted to the network device 110. The network device 110 may establish a LUT according to the device information, i.e., VIA or OS. Therefore, a LUT representing a relationship among keyword, user device, and user device availability is created. For example, a first user device supports iOS (OS) and Siri® (VIA) and transmits OS or VIA information to the network device 110. The network device 110 may establish the LUT including a relationship among keyword (Siri), the first user device, OS or VIA, and the availability of the first user device being YES according to the OS or VIA information. Once the processor 116 confirms that the user device supports VIA or OS corresponding to the keyword, the relationship is established in the LUT, otherwise, is not established. In one embodiment, OS type and VIA has one-to-one relationship. Thus, OS information could be used to establish LUT. In another embodiment, if OS corresponds to more than one VIA, the processor 116 may send a test keyword data and speech data to the connected user device for obtaining VIA status. In this way, the connected user device would feedback accurate results in response to the test keyword data and speech data.

If the connected user device cannot recognize the test keyword data, there is no response received by the network device 110.

Thereafter, the processor 116 compares the recognized keyword data with first keyword and second keyword, for example, Keyword_A, Keyword_B, Keyword_C and Keyword_D from the memory 117 and determines whether the word(s) or character(s) matches any of Keyword_A, Keyword_B, Keyword_C and Keyword D in the first LUT/second LUT based on the comparison. Each of Keyword_A, Keyword B, Keyword_C and Keyword_D can be a specific word or character, or specific words or characters in or not in a specific order, such as "Hello," "Hello World," or "World Hello."

In response to determining the word(s) matches a keyword in the first LUT/second LUT, for example, Keyword_A, that is, the utterance voiced by the user 200 includes a designated keyword, Keyword_A. According to the first LUT/second LUT, the character DO represents network device 110 and the character DO has been installed VIA_A/OS_A. Once the processor 116 identify the recognized keyword data corresponding to the Keyword_A, the processor 116 determines speech data received after the recognized keyword data being recognized by the speech recognition circuit 113, and sends the word recognition result(s) through the first communication path PATH_A to the first network 140.

| First Look-up Table | | | |
| --- | --- | --- | --- |
| Keyword | VIA | Device | Device availability |
| Keyword_A | VIA_A | D0 | YES |
| Keyword_B | VIA_B | D1 | YES |
| Keyword_C | VIA_C | D2 | NO |
| Keyword_D | VIA_D | D3 | NO |

| Second Look-up Table | | | |
| --- | --- | --- | --- |
| Keyword | OS | Device | Device availability |
| Keyword_A | OS_A | D0 | YES |
| Keyword_B | OS_B | D1 | YES |
| Keyword_C | OS_C | D2 | NO |
| Keyword_D | OS_D | D3 | NO |

Further, when the processor 116 identifies the recognized keyword data corresponding to the Keyword_B, the processor 116 determines speech data received after the recognized keyword data being recognized by the user device (D1), and sends the speech data through the second communication path PATH_B to the second network 150. In this embodiment, the user device D1 would generate word recognition results according to the speech data transmitted from the network device 110. The speech recognition circuit 113 of the network device 110 may, in response to receiving a recognition stopping signal from the processor 116, stop word recognition for speech data. The processor 116 will stop sending word recognition results based on speech data to the user device 120 without performing speech recognition for any such speech data.

The processor 116 is configured to control operation of the network device 110. In certain embodiments, the processor 116 may be a central processing unit (CPU). The processor 116 can execute any computer executable code or instructions, such as the communication path determination module 1171 of the network device 110 or other applications and instructions of the network device 110, and command components in the network device 110, for example, the speech recognition circuit 113, to perform their respective duties. In certain embodiments, the network device 110 may run on more than one processor, such as multiple processors.

The memory 117 can include at least one volatile memory, such as the random-access memory (RAM), for storing the data and information during the operation of the network device 110, and at least one non-volatile data storage medium for storing the computer executable code or instructions of the network device 110, such as the communication path determination module 1171. In certain embodiments, the volatile memory may be a volatile memory array.

The communication path determination module 1171 executed by the processor 116 is configured to determine and select between communication paths of the network device 110 and external networks for the network device 110 based on keyword recognition and device availability, including the availability of network device 110 itself and connected user devices. The communication path determination module 1171 may, when executed at the processor 116, receive the first keyword data, which can be represented as a text, from the speech recognition circuit 113, and the device information of the user device 120, for example, the VIA type, from the second communication circuit 112. In response to receiving both the keyword recognition signal from the speech recognition circuit 113 and the device information including, for example, the VIA type of the user device 120 from the second communication circuit 112. The processor 116 establishes a relationship among keywords, user devices and user device availabilities according to the VIA types in a LUT. In another embodiment, a relationship among keywords, network devices and network device availabilities is also established in the LUT. The processor 116 refers to a relationship between keywords and VIA types stored in the memory 117, compares the VIA types of the user device 120 with the relationship, determines whether the VIA types of the user device 120 corresponds to any VIA type stored in the memory 117, and establishes the first LUT. It should be noted that the column of VIA types may not be included in the first LUT since the processor 116 selects one of the network device 110 and the user device to generate word recognition results according to the recognized keyword.

Alternatively, the device information of the user device, for example, may be the OS type. It is similar to the aforementioned case, and the processor 116 establishes a relationship among keywords, user devices and user device availabilities according to the OS type in a LUT. The column of OS types may not be included in the second LUT. As long as the network device 110 is connected to any user device through the second communication circuit, the first LUT or the second LUT is created by the processor 116.

In response to determining that the keyword data matches a user device 120, the processor 116 sends the recognition stopping signal to the speech recognition circuit 113 that commands the speech recognition circuit 113 to stop word recognition for speech data, stop generating word recognition results based on speech data, and send to the communication path determination module 1171 any speech data received after receipt of the recognition stopping signal without performing speech recognition for such speech data. The processor 116 sends the speech data to the second communication circuit 112, so that the speech data can be sent to the user device 120 through the wireless network 130, that is, the second communication path PATH_B, for speech recognition by the user device 120. On the other hands, in response to determining that the keyword data matches the network device 110, the processor 116 sends the word recognition result(s) through the first communication path PATH_A, that is, through the first communication circuit 111 to the first network 140 for data search.

In certain embodiments, the networking hardware device 110 may differentiate between a plurality of user devices 120 that have the same VIA type or OS type, in which primary keywords are designated respectively for different VIA types or OS types and secondary keywords are designated respectively for the plurality of user devices 120 having the same VIA type or OS type. In certain embodiments, a secondary keyword may be a primary keyword affixed with at least one prefix or suffix character or word. For example, a primary keyword may be "Hello World," and a corresponding secondary keyword may be "Lee's Hello World" or "Hello World Lee." In certain embodiments, the secondary words and the primary words may be wholly or partially different words or characters. However, the present disclosure is not limited thereto. The networking hardware device 110 can therefore send first keyword data and second keyword data correspondingly to a user device 120 designated with a primary keyword and a secondary keyword which match the primary keyword and the secondary keyword in an utterance voiced by the user 200.

Third Look-up table

| Primary Keyword | VIA | Secondary Keyword | Device | Device Availability |
|---|---|---|---|---|
| Keyword_A | VIA_A | | D0 | Yes |
| Keyword_B | VIA_B | Keyword_B1 | D1 | Yes |
| | | Keyword_B2 | D2 | Yes |
| Keyword_C | VIA_C | Keyword_C1 | D3 | Yes |
| | | Keyword_C2 | D4 | No |
| Keyword_D | VIA_D | Keyword_D1 | D5 | No |
| | | Keyword_D2 | D6 | No |
| Keyword_E | VIA_E | Keyword_E1 | D7 | Yes |

Fourth Look-up table

| Primary Keyword | OS | Secondary Keyword | Device | Device Availability |
|---|---|---|---|---|
| Keyword_A | OS_A | | D0 | Yes |
| Keyword_B | OS_B | Keyword_B1 | D1 | Yes |
| | | Keyword_B2 | D2 | Yes |
| Keyword_C | OS_C | Keyword_C1 | D3 | Yes |
| | | Keyword_C2 | D4 | No |
| Keyword_D | OS_D | Keyword_D1 | D5 | No |
| | | Keyword_D2 | D6 | No |
| Keyword_E | OS_E | Keyword_E1 | D7 | Yes |

As exemplarily shown above in the third LUT, the third LUT may include information of the primary keyword, the secondary keyword, the VIA type and the identity of each user device 120 that has been known to be communicatively connectable with the networking hardware device 110 via the wireless network 130. As exemplarily shown above in the fourth LUT, the fourth LUT may include information of the primary keyword, the secondary keyword, the OS type and the identity of each user device 120 that has been known to be communicatively connectable with the networking hardware device 110 via the wireless network 130. Please note that the device D0 represents network device 110 and the D0 has been installed VIA_A/OS_A. For example, the third LUT or the fourth LUT may show user devices D1 and D2 have the same primary keyword Keyword_B, and different secondary keywords Keyword_B1 and Keyword_B2, respectively; user devices D3 and D4 have the same primary keyword Keyword_C, and different secondary keywords Keyword_C1 and Keyword_C2, respectively; user devices D5 and D6 have the same primary keyword Keyword_D, and different secondary keywords Keyword_D1 and Keyword_D2, respectively; and the user device D7 has a primary keyword Keyword_E. The primary keywords Keyword_A to Keyword_E are different from each other, the VIA types VIA_A to VIA_E or the OS type OS_A to OS_E are different from each other, the secondary keywords Keyword_B1 to Keyword_E1 are different from each other, and the user devices D0 to D7 are different from each other.

The processor 116 may determine whether the recognized keyword(s) matches any primary keyword in the third LUT based on the comparison. In response to determining the recognized keyword(s) matches the primary keyword, the processor 116 compares a second keyword data with the secondary keyword in accordance with the third LUT to determine which one of the user devices can be used to recognize the speech data.

For example, as shown above in the third LUT, the processor 116 may determine that the received device IDs match the identities of the user devices D1-D3 and D7, and updates the user device availability table to indicate user devices D1-D3 and D7 are available and user devices D4-D6 are unavailable. D0 is always available, since D0 itself is the network device 110. In certain embodiments, in response to failing to receive a signal from a user device 120 listed in the third LUT for a predetermined period of time, the processor 116 updates the third LUT to indicate that user device 120 is unavailable. In response to determining that at least one user device 120 in the third LUT is available, for example, the processor 116 may determine the primary keywords Keyword_B, Keyword_C and Keyword_E to be corresponding to the available user devices D1-D3 and D7 according to the third LUT.

In response to determining a second keyword data is received, the processor 116 determines the second keyword(s) of the available user device(s) 120 according to the second keyword data based on the third LUT. In certain embodiments, the user device 120 may be controlled by the network device 110 to perform speech recognition through Audio/Video Remote Control Profile (AVRCP) configured in the user device 120 and the network device 110.

In certain embodiments, in response to determining the second keyword data is received for a predetermined period of time, if no secondary keyword matches the second keyword data based on the third LUT, the user devices for the second keyword data is not available. If the secondary keyword matches the second keyword data base on the third LUT and none of the user devices corresponds the secondary keyword is available based on the third LUT, the user should try to provide a different first keyword data or a different second keyword data.

When the first keyword data corresponds to the primary keyword (Keyword_B), the processor 116 determines the available user device(s) 120 corresponding to the recognized primary keyword Keyword_B among the available user devices 120, that is, user device D1 and user device D2. Then, the network device 110 receives second keyword data. The processor 116 compares a second keyword data with the secondary keyword in accordance with the third LUT to determine which one of the user devices can be used to recognize the speech data. When the second keyword data corresponds to the secondary keyword (Keyword_B2), the processor 116 determines the available user device(s) 120 corresponding to the recognized secondary keyword Keyword_B2 among the available user devices 120, that is, user device D2. The processor 116 designates the speech data received from the speech recognition circuit 113 directed to the available user device D2.

Referring again to the third LUT, when the first keyword data corresponds to the primary keyword (Keyword_C), the processor 116 determines the available user device(s) 120 corresponding to the recognized primary keyword Keyword_C among the available user devices 120, that is, user device D3. In response to determining only one available user device D3 corresponds to the first keyword data, the processor 116 designates the speech data received from the speech recognition circuit 113 directed to the only available user device D3.

When the first keyword data corresponds to the primary keyword (Keyword_D), the processor 116 determines that none of the user device, which corresponds to Keyword_D, is available according to the third LUT. Alternatively, the processor 116 may determine whether the recognized keyword(s) matches any primary keyword in the fourth LUT based on the comparison. Since the comparison in the fourth LUT is the same as the comparison in the third LUT, the detail description for the determination of the OS types is omitted herein.

In certain embodiments, the network device 110 may further includes a graphical user interface (GUI), which enables a user to manually input, add, delete, revise and/or update information stored in the network device 110, including but not limited to keywords to be recognized by processor 116, the keywords corresponding to the OS type(s) of the user device(s) 120, the identit(ies) of the user device(s) 120, the primary keyword(s), and secondary keyword(s) corresponding to the identit(ies) of the user device(s) 120, the VIA installation status and the corresponding keyword(s) of the network device 110.

Figure 3:
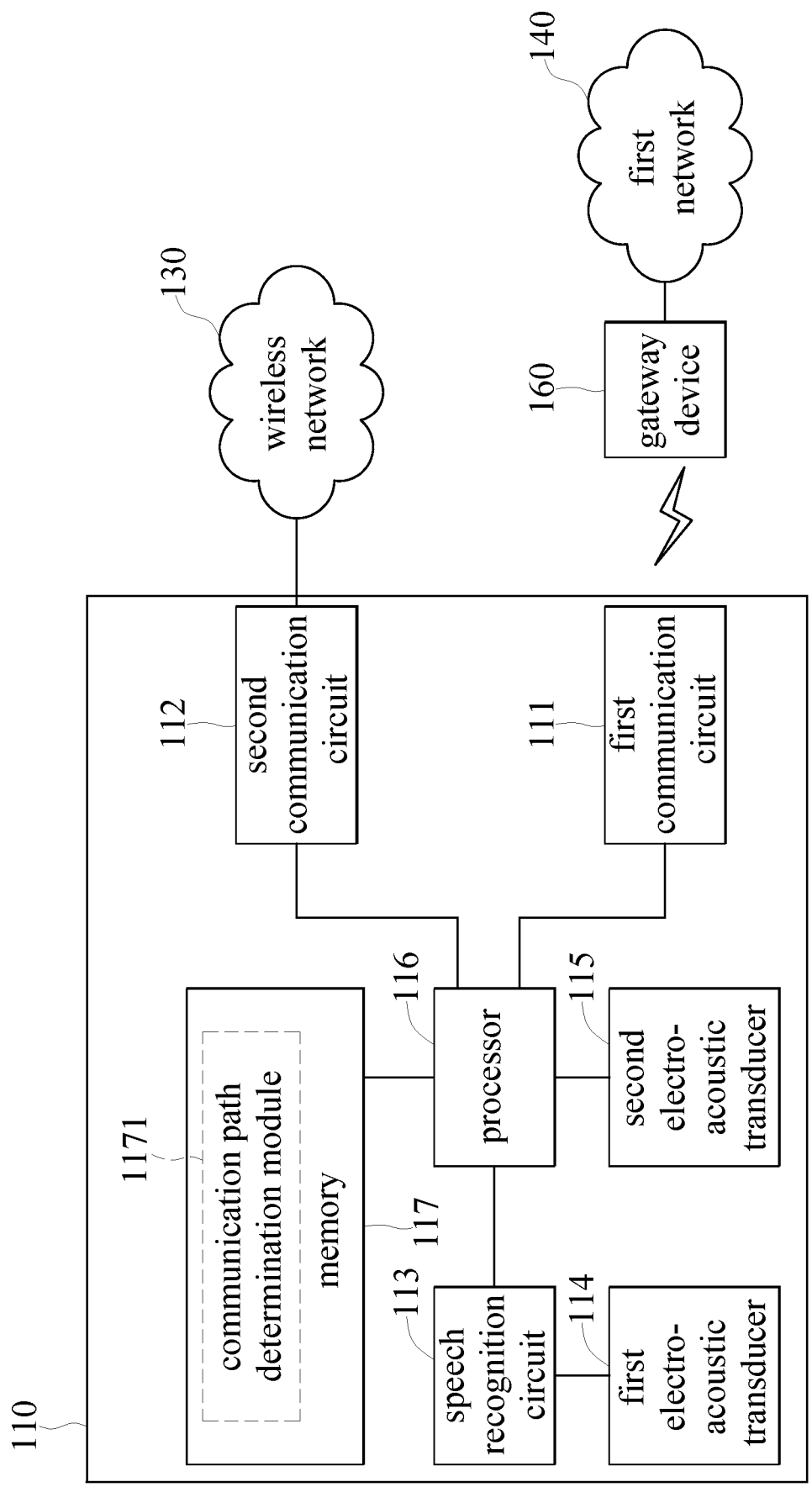
FIG. 3 is a schematic diagram of the network device 110 being associated with a gateway device 160 according to certain embodiments of the present disclosure.

FIG. 3 schematically depicts the network device 110 being associated with a gateway device 160 according to certain embodiments of the present disclosure. As shown in FIG. 3, the first communication circuit 111 of the network device 110 is communicatively interconnected with the gateway device 160 and the first network 140. The gateway device 160 may be a hardware device configured to mediate data between different networks, for example, between a wireless network (e.g., a Wi-Fi network) and a wired network (e.g., an Ethernet network). For example, the gateway device 160 may have communication capacities to enable wireless communication with the first communication circuit 111 and/or the first network 140, and wired communicative connection with the first network 140 through, for example, Ethernet. In certain embodiments, the first communication circuit 111 may be a communication circuit having Wi-Fi communication capacities to enable Wi-Fi communication with the gateway device 160. Accordingly, word recognition results can be sent from the first communication circuit 111 to the first network 140 through the gateway device 160.

Figure 4:
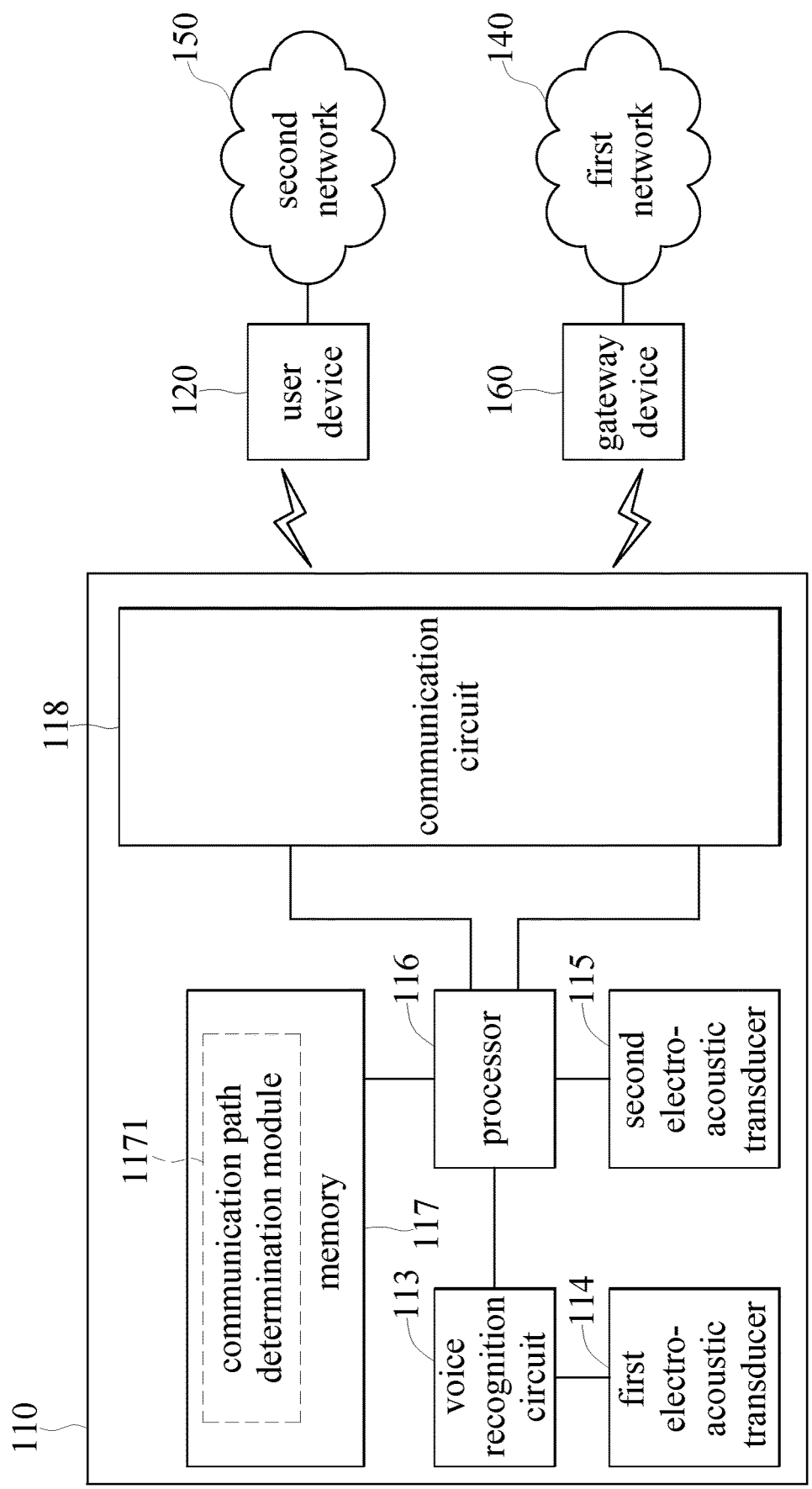
FIG. 4 is a schematic diagram of the network device 110 having a single communication circuit according to certain embodiments of the present disclosure.

FIG. 4 schematically depicts a network device 110 having a single communication circuit 118 capable of communicatively interconnected with the first network 140 via the gateway device 160 through the first communication path PATH_A and with the second network 150 via the user device 120 through the second communication path PATH_B. In certain embodiments, the communication circuit 113 may have wireless (e.g., Wi-Fi) communication capacities to enable wireless communication with the user device 120 and the gateway device 160. The communication circuit 118 receives speech data designated with destination information directed to a particular available user device 120 from the processor 116, and word recognition results designated with destination information directed to the gateway device 160 and the first network 140, and sends the speech data designated for the user device to the particular user device 120 and/or the word recognition results designated for the gateway device 160 and the first network 140 to the gateway device 160 according to the destination designation information.

Figure 5:
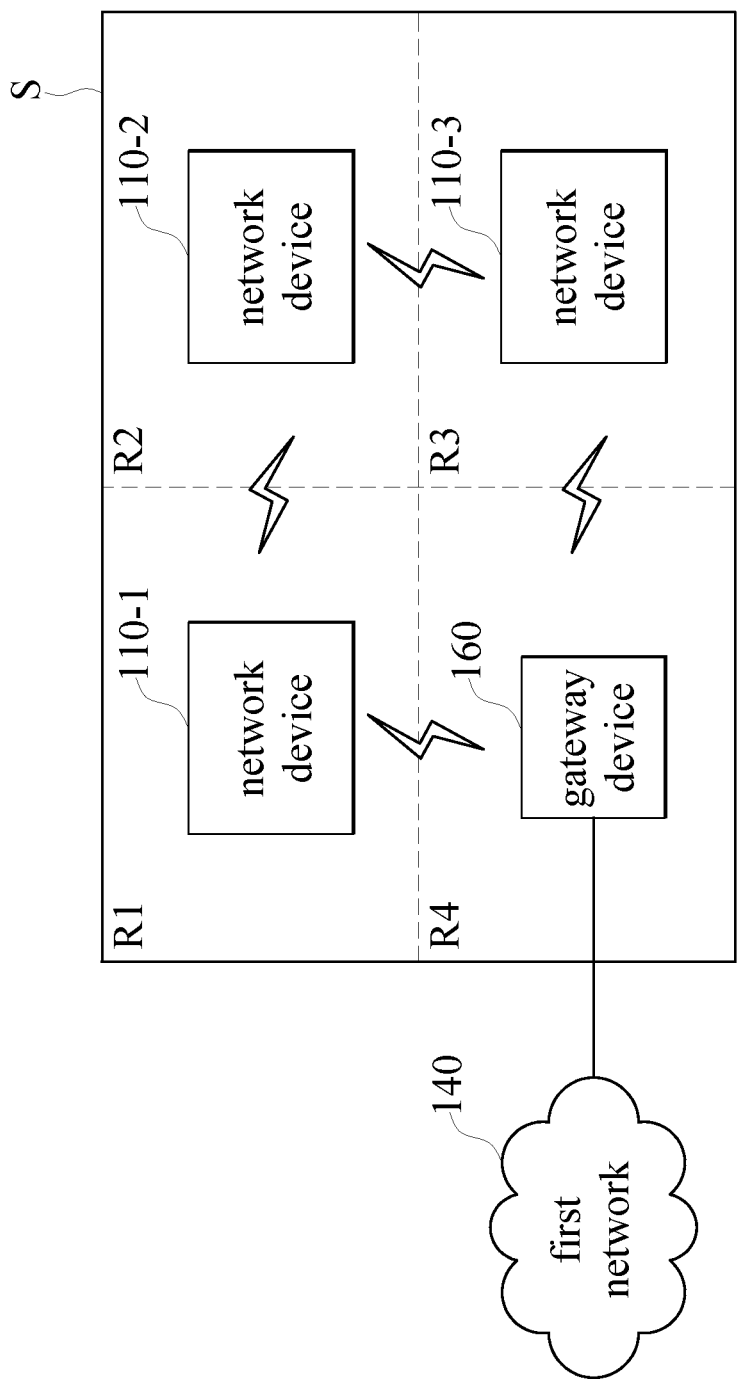
FIG. 5 is a schematic diagram of a network device mesh system formed by a plurality of network devices 110 according to certain embodiments of the present disclosure.

FIG. 5 schematically depicts a network device mesh system formed by a plurality of network devices 110 as discussed supra. As shown in FIG. 5, the network device mesh system includes a plurality of network devices 110-1, 110-2 and 110-3 respectively deployed in a first region R1, a second region R2 and a third region R3 of a space S, and the gateway device 160 deployed in a fourth region R4 of the space S. Each of the network devices 110-1, 110-2 and 110-3 is capable of communicatively interconnecting with at least another network device, and at least one of the network devices 110-1, 110-2 and 110-3 is capable of communicatively interconnecting with the gateway device 160. The gateway device 160 is capable of communicatively interconnecting with the first network 140. In such a configuration, each network device can be communicatively connected to the first network 140 via the gateway device 160. In certain embodiments, each of the network devices 110-1, 110-2 and 110-3 can be communicatively connected with at least another network device through its first communication circuit 111, communication circuit 118 or second communication circuit 112 over a wireless network, and at least one network device 110 can be communicatively connected with the gateway device 160 through its first communication circuit 111 or communication circuit 118 over a wireless network. However, the present disclosure is not limited thereto.

The network devices 110 may be deployed at different locations. In certain embodiments, the network devices 110 are spaced from each other according to signal strength of at least one predetermined communication between the network devices 110 and between the network devices 110 and the gateway device 160. For example, as shown in FIG. 5, the deployment of the network devices 110-1 to 110-3 and the gateway device 160 respectively in the first region R1, the second region R2, the third region R3 and the fourth region R4 may satisfy a condition that the signal strength of the communication of each network device 110 with at least another one network device 110, that is, at least two of that between the network devices 110-1 and 110-2, between the network devices 110-2 and 110-3, and between the network devices 110-1 and 110-3, is equal to or greater than a predetermined communication signal strength, and the signal strength of the communication of the gateway device 160 with at least one network device 110, that is, between the networking gateway device 160 and one of the network devices 110-1 to 110-3, is equal to or greater than the predetermined communication signal strength.

Each of the network devices 110-1 to 110-3 is configured to perform the above discussed tasks including, but not limited to, keyword recognition, user device information comparison, keyword identification, VIA identification by the speech recognition circuit 113 and the processor 116, so as to determine whether any user device 120 corresponding to a keyword uttered by the user 200 is currently in communicative connection with the network device 110, that is, available for the current network device 110, for example, the network device 110-1. The network device 110-1 may receive LUTs from network device 110-2 and 110-3 for obtaining relationships between keywords and devices availability. Upon the LUTs from other network devices, the network device 110-1 may route speech data to the appropriate user device 120 even if a user device 120 is not in the region R1. In response to determining that such a user device 120 is available, the network device 110-1 sends speech data through its second communication circuit 112, that is, through the second communication path PATH_B, to the available user device 120. An available user device may be determined and selected based on the above-referenced tables stored in the memory 117 of the current network device 110-1.

Figure 6:
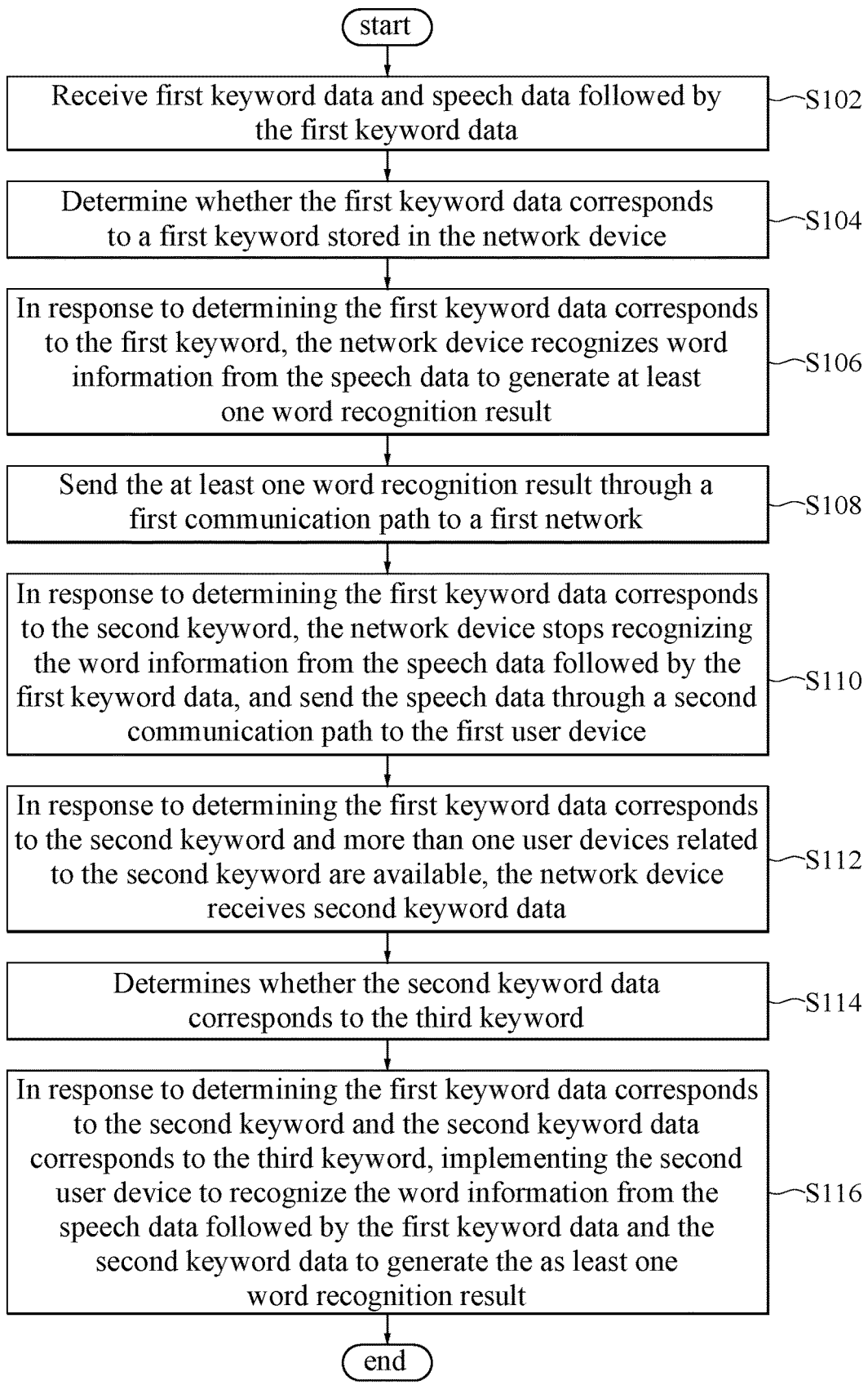
FIG. 6 is flowchart showing a method for determining a network device communication path based on speech recognition and user device availability according to certain embodiments of the present disclosure.

A further aspect of the present disclosure is directed to a method for determining a network device communication path based on speech recognition and user device availability. FIG. 6 depicts a flowchart showing the method according to certain embodiments of the present disclosure. In certain embodiments, the method as shown in FIG. 6 may be implemented on a network device 110 of the system 100 as shown in FIG. 1. It should be particularly noted that the sequence of the procedures as described in the flowchart as shown in FIG. 6 may vary, and is thus not intended to limit the disclosure thereof.

In step S102, the network device 110 receives first keyword data and speech data. The first keyword data and the speech data is generated by a user. The speech data is followed by the first keyword data.

In step S104, the network device 110 determines whether the first keyword data corresponds to a first keyword stored in the network device 110. Specifically, the processor 116 of the network device 110 is used to determine whether the first keyword data corresponds to the first keyword stored in the network device 110.

In step S106, in response to determining the first keyword data corresponds to the first keyword, the network device 110 recognizes word information from the speech data to generate at least one word recognition result. When the first keyword data corresponds to the first keyword, the first keyword data is supported by the network device 110 and the network device 110 is capable of recognizing the word information from the speech data to generate at least one word recognition result.

In step S108, the network device 110 sends the at least one word recognition result through a first communication path to a first network after the network devices 110 recognizes the word information from the speech data.

In step S110, in response to determining the first keyword data corresponds to the second keyword, the network device stops recognizing the word information from the speech data followed by the first keyword data, and send the speech data through a second communication path to the first user device. When the first keyword data does not correspond to the first keyword, the network device 110 will determine whether the first keyword data corresponds to the second keyword or not. If the first keyword data corresponds to the second keyword, the network device 110 will send the speech data through the second communication path to the first user device. It should be noted that the network device may send a command or the first keyword data to enable the VIA of the connected user device.

In step S112, in response to determining the first keyword data corresponds to the second keyword and more than one user devices related to the second keyword are available, the network device 110 receives second keyword data. For example, when there are three user devices available, the network device 110 needs to determine which one of the user devices is going to be used to recognize the speech data.

In step S114, the network device 110 determines whether the second keyword data corresponds to the third keyword. When the first keyword data corresponds to the second keyword, the network device further determines whether the second keyword data corresponds to the third keyword.

In step S116, in response to determining the first keyword data corresponds to the second keyword and the second keyword data corresponds to the third keyword, implementing the second user device to recognize the word information from the speech data followed by the first keyword data and the second keyword data to generate the as least one word recognition result. The determined user device is corresponding to the third keyword. That is, the relationship in LUT is established between the third keyword and the determined user device being available. It should be noted that different VIAs for different user devices may include different database. When the speech data is recognized by the different user devices with different VIAs, the word recognition result may be different.

The foregoing description of the exemplary embodiments of the present disclosure has been presented only for the purposes of illustration and description and is not intended to be exhaustive or to limit the present disclosure to the precise forms disclosed. Many modifications and variations are possible in light of the above teaching.

Certain embodiments were chosen and described in order to explain the principles of the present disclosure and their practical application so as to enable others skilled in the art to utilize the present disclosure and various embodiments and with various modifications as are suited to the particular use contemplated. Alternative embodiments will become apparent to those skilled in the art to which the present disclosure pertains without departing from its spirit and scope.

What is claimed is:

1. A network device, connected to a first user device and comprising a processor and a memory storing computer executable code executed by the processor, and the network device is configured to:
   receive first keyword data and speech data followed by the first keyword data;
   determine whether the first keyword data corresponds to a first keyword;
   in response to determining that the first keyword data corresponds to the first keyword, recognize word information from the speech data to generate at least one word recognition result;
   send the at least one word recognition result through a first communication path to a first network; and
   in response to determining that the first keyword data corresponds to a second keyword, stop recognizing the word information from the speech data followed by the first keyword data, and send the speech data through a second communication path to the first user device.

2. The network device according to claim 1, wherein the network device is further configured to:
   receive device information of the user device; and
   establish a look-up table (LUT) including a corresponding relationship between the second keyword and first user device availability according to the device information.

3. The network device according to claim 2, wherein the device information of the first user device includes a type of a voice interaction application (VIA) or an operating system (OS).

4. The network device according to claim 2, wherein the first keyword corresponds to a first voice interaction application (VIA) or a first operating system (OS) and the second keyword corresponds to a second VIA or a second OS, wherein the first VIA or the first OS is installed in the network device and the second VIA or the second OS is installed in the first user device.

5. The network device according to claim 4, wherein the LUT further includes another corresponding relationship between the first keyword and network device availability.

6. The network device according to claim 2, wherein the second communication path is connected to a second network via the first user device, and databases of the first network and the second network are different.

7. The network device according to claim 1, further comprising a first communication circuit forming the first communication path and a second communication circuit forming the second communication path, wherein an operating power of the second communication circuit is lower than the operating power of the first communication circuit.

8. The network device according to claim 1, wherein the network device is connected to a second user device and the network device is further configured to:
receive second keyword data when the first keyword data corresponds to the second keyword;
determine whether the second keyword data corresponds to a third keyword; and
in response to determining that the first keyword data corresponds to the second keyword and the second keyword data corresponds to the third keyword, implement the second user device to recognize the word information from the speech data to generate the at least one word recognition result, wherein the second keyword and the third keyword correspond to the second user device.

9. A method for determining a communication path for a network device, the network device being connected to a first user device, the method comprising:
receiving first keyword data and speech data followed by the first keyword data;
determining whether the first keyword data corresponds to a first keyword by a processor;
in response to determining that the first keyword data corresponds to the first keyword, recognizing word information from the speech data to generate at least one word recognition result;
sending the at least one word recognition result through a first communication path to a first network; and
in response to determining that the first keyword data corresponds to a second keyword, stopping recognition of the word information from the speech data, and sending the speech data through a second communication path to the first user device.

10. The method for determining the communication path for the network device according to claim 9, further comprising:
receiving device information of the user device; and
establishing a look-up table (LUT) including a corresponding relationship between the second keyword and first user device availability according to the device information by the processor.

11. The method for determining the communication path for the network device according to claim 10, wherein the device information of the first user device includes a voice interaction application (VIA) or an operating system (OS).

12. The method for determining the communication path for the network device according to claim 10, wherein the first keyword corresponds to a first VIA or a first OS and the second keyword corresponds to a second VIA or a second OS, wherein the first VIA or the first OS is installed in the network device and the second VIA or the second OS is installed in the first user device.

13. The method for determining the communication path for the network device according to claim 12, wherein the LUT further includes another corresponding relationship between the first keyword and network device availability.

14. The method for determining the communication path for the network device according to claim 10, wherein the second communication path is connected to a second network via the first user device, and databases of the first network and the second network are different.

15. The method for determining the communication path for the network device according to claim 9, further comprising a first communication circuit forming the first communication path and a second communication circuit forming the second communication path, wherein an operating power of the second communication circuit is lower than the operating power of the first communication circuit.

16. The method for determining the communication path for the network device according to claim 9, wherein the network device is connected to a second user device, the method further comprising:
receiving second keyword data when the first keyword data corresponds to the second keyword;
determining whether the second keyword data corresponds to a third keyword; and
in response to determining that the first keyword data corresponds to the second keyword and the second keyword data corresponds to the third keyword, implementing the second user device to recognize the word information from the speech data to generate the at least one word recognition result, wherein the second keyword and the third keyword correspond to the second user device.

17. The method for determining the communication path for the network device according to claim 9, further comprising:
sending a command or the first keyword data to enable a voice interaction application (VIA) of the first user device in response to determining that the first keyword data corresponds to the second keyword.

* * * * *